US006276463B1

United States Patent
Hollimon et al.

(10) Patent No.: US 6,276,463 B1
(45) Date of Patent: Aug. 21, 2001

(54) COMPACTED SOIL AND ROCK RAISING BLADE

(76) Inventors: Johnnie T. Hollimon, P.O. Box 450, Cliff, NM (US) 88028; Thomas G. McCauley, Jr., P.O. Box 737, Morenci, AZ (US) 85540; Dennis C. Swapp, P.O. Box 81, Luna, NM (US) 87824

( * ) Notice: Subject to any disclaimer, the term of this patent is extended or adjusted under 35 U.S.C. 154(b) by 0 days.

(21) Appl. No.: 09/071,426

(22) Filed: May 1, 1998

Related U.S. Application Data (60) Provisional application No. 60/045,424, filed on May 2, 1997.

(51) Int. Cl.$^7$ .................................................. A01D 13/10
(52) U.S. Cl. ........................ 172/699; 172/721; 172/730
(58) Field of Search .................... 172/721, 699, 172/196, 724, 732, 700, 730, 733

(56) References Cited

U.S. PATENT DOCUMENTS

| | | | |
|---|---|---|---|
| 447,305 | * | 3/1891 | Fish ...................................... 172/730 |
| 568,143 | * | 9/1896 | Parcells ............................... 172/376 |
| 1,314,394 | | 8/1919 | Grimes . |
| 1,412,614 | * | 4/1922 | Huston ................................. 172/698 |
| 1,894,516 | | 1/1933 | Karstedt . |
| 1,909,752 | | 5/1933 | Calkins . |
| 2,154,970 | | 4/1939 | Briggs . |
| 2,190,347 | | 2/1940 | Austin . |
| 2,688,910 | | 9/1954 | Adair . |
| 2,762,286 | * | 9/1956 | Dorsch ................................. 172/699 |
| 2,769,625 | * | 11/1956 | Wooldridge ......................... 172/657 |
| 2,845,725 | * | 8/1958 | Robishaw et al. ................... 172/196 |
| 3,022,836 | * | 2/1962 | Bechman ............................. 172/698 |
| 3,101,794 | * | 8/1963 | Bechman ............................. 172/698 |
| 3,180,430 | * | 4/1965 | Launder et al. ..................... 172/700 |
| 4,010,805 | * | 3/1977 | Kelley ................................. 172/698 |
| 4,426,940 | * | 1/1984 | Brain et al. .............................. 111/7 |
| 4,560,010 | * | 12/1985 | Weichel ............................... 172/196 |
| 4,815,545 | | 3/1989 | Symonds . |
| 4,850,435 | * | 7/1989 | Morris et al. ........................ 172/730 |
| 5,103,918 | | 4/1992 | Puntoni . |
| 5,752,407 | * | 5/1998 | Becker et al. ......................... 72/475 |
| 5,941,318 | * | 8/1999 | Bergen ................................. 172/730 |

FOREIGN PATENT DOCUMENTS

| 275396 | * | 5/1967 | (AU) ................................... 172/700 |
|---|---|---|---|
| 0964071 | * | 10/1982 | (SU) ................................... 172/699 |

OTHER PUBLICATIONS

"'V' Shaped Parabolic Subsoiler," Beth Hashitta Haroshet Matekhet, pp. 1 and 2, Jan. 1981.*

* cited by examiner

*Primary Examiner*—Robert E. Pezzuto
*Assistant Examiner*—Nathan Mammen
(74) *Attorney, Agent, or Firm*—Peacock, Myers & Adams PC (57) ABSTRACT

Apparatus for the subsurface disruption of soil which includes horizontal and vertical members enabling operation at great depths without excessive driving force. The apparatus includes vertical members having a top end and a bottom end, wherein the top end is removably connectable to a driver, such as a tractor, and the bottom end is attached to a horizontal member. The apparatus includes horizontal members having a top surface and a bottom surface, wherein the top surface comprising a leading surface and a tailing surface. The substantially horizontal bottom surface, upon intersection with the leading top surface and the trailing top surface, forms a triangular cross section, preferably that of a scalene triangle. This cross sectional form allows for optimum operation.

11 Claims, 6 Drawing Sheets

COMPACTED SOIL AND ROCK RAISING BLADE

CROSS-REFERENCE TO RELATED APPLICATIONS

This application claims the benefit of the filing of U.S. Provisional Patent Application Ser. No. 60/045,424, entitled Compacted Soil and Rock Raising Blade, filed on May 2, 1997, and the specification thereof is incorporated herein by reference.

BACKGROUND OF THE INVENTION

1. Field of the Invention (Technical Field)

The present invention relates to plowing and other soil disruption devices that operate at subsurface levels.

2. Background Art

Draft-driven subsurface plows have been used for centuries, while the use of mechanically driven subsurface plows has developed more recently. By design, most subsurface plows minimize the mixing of soil layers. Subsurface plows also differ from harrows which work to break up and level surface soil. Subsurface soil plows typically operate at shallow depths, less than 1 foot, to cut shallow root systems and disrupt the hard pan or plow sole that forms beneath the blade during normal tilling operations. Crops and other vegetation with shallow root systems seldom form stable above ground structures, this allows animals and tractors to pass over in a relatively unimpeded manner. Extending subsurface plow techniques to uproot trees or vegetation with deep roots and significant above ground structure is a formidable task. No known prior patents exist on deep subsurface plows.

Subsurface plowing devices that break up the hard pan or plow sole also increase the permeability of the soil. In the Midwestern prairies, where surface soil may be only a few inches thick, subsurface plowing within the upper reaches of the clay layer breaks up the hard clay layer and increases water drainage. During this process, surface soil must not move downward nor clay upward; the goal is to disrupt a particular zone or layer only, thereby increasing overall permeability. In both of these applications, the plow does not run far below the top surface of the soil.

In mining and certain soil remediation practices, an increase in soil permeability leads to enhanced mineral recovery or soil decontamination. Unlike most agricultural situations, in mining and remediation, the relevant soil layer extends beyond the first foot of top soil. In heap-leach mining, an increase in permeability allows the leach solution to percolate deeper and faster, thereby reducing undesirable leach solution run-off. In soil remediation, an increase in permeability allows microbial degradation broth to percolate deeper and better seed the contaminated soil. For aerobic biological decontamination, the increase in permeability also leads to an increase in soil oxygenation. Increased soil oxygen levels enable aerobic microorganisms to thrive thereby speeding the decontamination process. Compaction of soil caused by truck or tractor traffic decreases permeability. Permeability also decreases when a crust forms on the surface of the soil. In both instances, ripping with a deep subsurface plow leads to an increase in soil permeability and more efficient mineral recovery or soil remediation.

Techniques have been developed for agricultural subsurface plowing, and examples appear in the following patents:

U.S. Pat. No. 1,314,394, entitled "Plow," issued on Aug. 26, 1919, to Grimes, describes a shallow subsurface plow with a specially shaped blade for harvesting peanuts and various tuberous plants. For peanut harvesting, the design allows the plow to lift and separate the peanuts from the ground.

U.S. Pat. No. 1,894,516, entitled "Brush Cutter," issued on Jan. 17, 1933, to Karstedt, describes a front mounted tractor brush cutter with a straight-edged blade fixed between two side supports. The front mounted arrangement purportedly allows the device to thrust heavier brush and young trees downward so that the tractor can pass unimpeded.

U.S. Pat. No. 1,909,752, entitled "Tree and Plant Digging Implement," filed on May 16, 1933, to Calkins, describes a U-shaped digger blade for digging young tree seedlings and plants in a manner to avoid injury to the roots. The angled blade design lifts trees and plants about four inches from their original position in the soil. This allows for most tree seedlings and all plants to be easily pulled from the ground with one hand.

U.S. Pat. No. 2,154,970, entitled "Grubbing Implement," filed on Apr. 18, 1939, to Briggs, describes a plow with a V-shaped blade to cut underground roots and aerate soil. In addition to the horizontal blade, the plow has blades on the side support arms to cut roots running horizontally and transversely to the line of movement.

U.S. Pat. No. 2,190,347, entitled "Earth Mover," issued on Feb. 13, 1940, to Austin, describes a root cutter for low growth vegetation. The cutting blade operates at a level of eight to ten inches below the ground surface.

U.S. Pat. No. 4,815,545, entitled "Subsoil Blade Ploughs," issued on Mar. 28, 1989, to Symonds, describes a plow for treating ground to improve growing conditions. The plow has both a V-shaped blade and a tyne mounted aft of the blade. The tyne breaks up a hard pan in conjunction with the swept wing blade. The effectiveness of the tyne depends on the angle with respect to the horizontal swept wing blade.

U.S. Pat. No. 5,103,918, entitled "Tillage Unit," issued on Apr. 14, 1992, to Putoni, describes a tilling plow that minimizes soil surface and soil crop residue disturbance. The depth of the plow adjusts to prevent formation of a plow sole.

Nevertheless, the need remains for a plow which beneficially disrupts subsurface soil at substantial depth without offering undue resistance to movement. In particular, a subsurface plow that disrupts a large volume of soil in a single pass through the ground is desirable, particularly in heap leach mining applications.

SUMMARY OF THE INVENTION (DISCLOSURE OF THE INVENTION)

The present invention refers to an apparatus for increasing the permeability of soils. The invention accomplishes this task through an implement designed for deep subsurface plowing. The subsurface plow operates at depths of one foot or greater. The design of the plow apparatus causes overlying soil to disrupt, shift and fragment. The fragmentation of the overlying soil leads to an increase in soil permeability. According to the invention, there is disclosed a horizontal member that is dragged through the subsurface by means of upright members attached to a tractor, to raise and then drop the subsoil to promote the beneficial break-up and aeration. The horizontal member optionally is provided with a removably attachable and replaceable ripping blade along its leading edge.

A primary object of the present invention is to beneficially disrupt soil to enhance soil permeability.

A primary advantage of the present invention is that the present invention can disrupt a larger volume of soil than existing subsurface plows.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3b is a partial, enlarged, sectional side view in elevation of the embodiment of FIG. 3a, taken substantially along section line B—B in FIG. 3a;

FIG. 6 is a side view of the apparatus attached to a tractor.

DESCRIPTION OF THE PREFERRED EMBODIMENTS

Best Modes for Carrying Out the Invention

The invention relates to subsurface plows, particularly to a plow configuration that permits subsurface disruption at substantial depths. The invention has primary beneficial use in the mining industry, where it frequently is desirable to perform disruption and subsurface disturbance of leaching heaps that have become compacted or encrusted at the surface. However, it will be immediately apparent that the invention may find useful application in other industries, including agriculture and construction.

According to the invention, the inventive apparatus for beneficially disrupting subsurface soil is movable in the ground by a tractor. The tractor allows for both horizontal and vertical motion of the apparatus. Typically, the apparatus is pulled behind the tractor, but the practice of the invention includes the pushing of the apparatus in front of the tractor. The practice of the invention also includes pulling of the apparatus in front of the tractor and pushing of the apparatus behind the tractor while the tractor is in reverse movement. In this disclosure and the claims, "tractor" includes all suitable sources of motive force, but particularly includes all conventional mechanized tractors, bulldozers, trucks, and the like.

Referring to the figures, a preferred embodiment of the inventive apparatus includes at least one, and preferably two, upright members 1, 1', each having a top end and a bottom end. The top end is removably connectable to the tractor T by any suitable means, including threaded bolts. A horizontal member 2 is attached to the bottom end of each of the upright members 1, 1'. In one embodiment, seen in FIGS. 1–3a, the horizontal member 2 comprises a V-shaped plan profile, while in an alternative embodiment seen in FIG. 4, the horizontal member has a substantially rectangular plan profile.

Each horizontal member features a top surface, preferably comprising a leading top surface 11 and a trailing top surface 19. Each horizontal member features a bottom surface, preferably a substantially horizontal bottom surface 12. The bottom surface 12 intersects the leading top surface 11 at a leading edge 9, while the bottom surface intersects the trailing top surface 19 at a trailing edge 10. As best seen in FIG. 3b, the leading top, the trailing top, and the bottom surfaces 11, 19, 12 collectively define a substantially triangular cross section of said horizontal member 2.

Figure 1A:
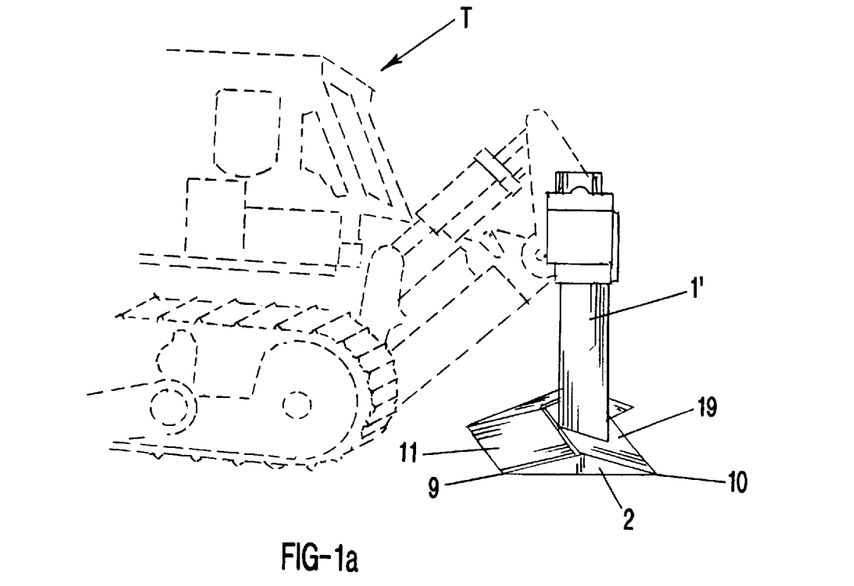
FIG. 1a is a side elevation view of an apparatus according to the first embodiment of the invention.
Figure 1B:
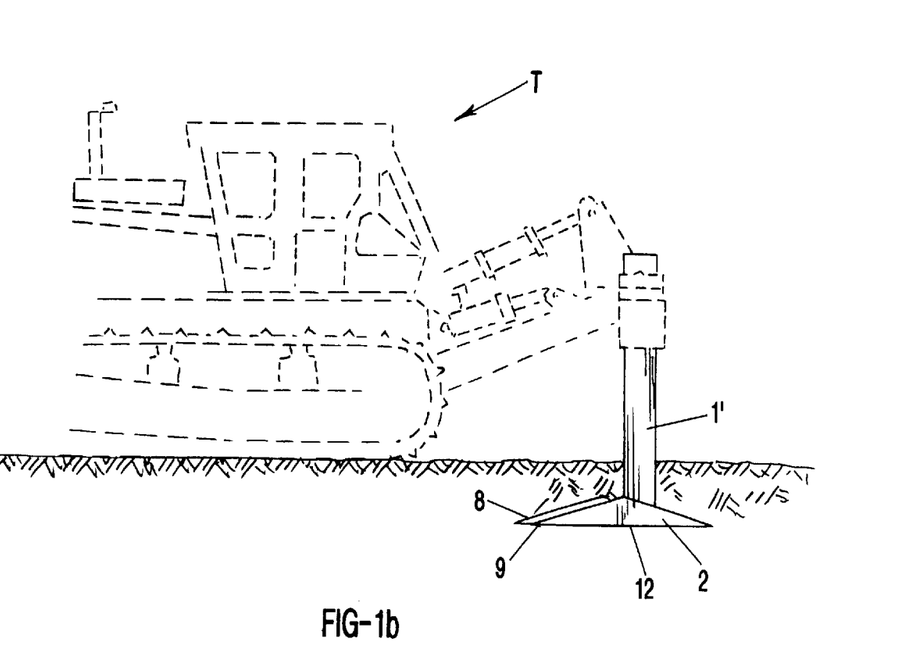
FIG. 1b is a side elevation view of the apparatus according to the first embodiment, when within the soil and in a subsurface disrupting position.

The apparatus of the invention preferably, but not necessarily, includes at least one ripping blade 8 attached to the leading top surface 11 and extending forward beyond the leading edge 9 and vertically below the bottom surface 12, a seen in FIG. 1b. The ripping blade 8 preferably is removably attachable to the leading top surface 11 as by a plurality of holes 13, 13' in the surface 11 and blade 8, respectively, which can be aligned to receive bolts or the like so that the blade 8 can be removed for repair or replacement and then re-attached to the leading top surface 11, as indicated by FIG. 3.

As suggested by the figures, especially FIG. 3b, the triangular cross section of the horizontal member 2 typically is a scalene triangle. More specifically, and referring to FIG. 3b, the intersection of the bottom surface 12 with the top leading surface 11 defines an angle X. An aspect of the invention is a determination that, for purposes of sub-surface soil lifting and disruption, angle X is at least approximately 11 degrees, most preferably from approximately 35 degrees to approximately 37 degrees. Larger angles offer too much drag resistance when the apparatus is moved horizontally below the surface, while angles X of less than about 11 degree provide insufficient lift adequately to disrupt the soil and promote surface infiltration. Thus, it has been determined that a certain ranges of "angles of attack" permits the horizontal member 2 to be passed through the subsurface at substantial depths (e.g. at least one foot or more) with an acceptable amount of applied force, while also providing an optimum amount of beneficial disruption to the ground to enhance permeability and permit increased water or liquid chemical infiltration, etc. Similarly, the intersection of the bottom surface 12 with the top trailing surface 19 defines an angle Y. For similar reasons of efficiency and effectiveness, the angle Y preferably is between about 10 degrees and about 16 degrees, also to allow the apparatus to move through the subsurface without undue resistance, while yet promoting adequate subsurface disruption. The depth at which the blade goes should be at least 4 feet and preferably at least 6 feet.

Figure 2:
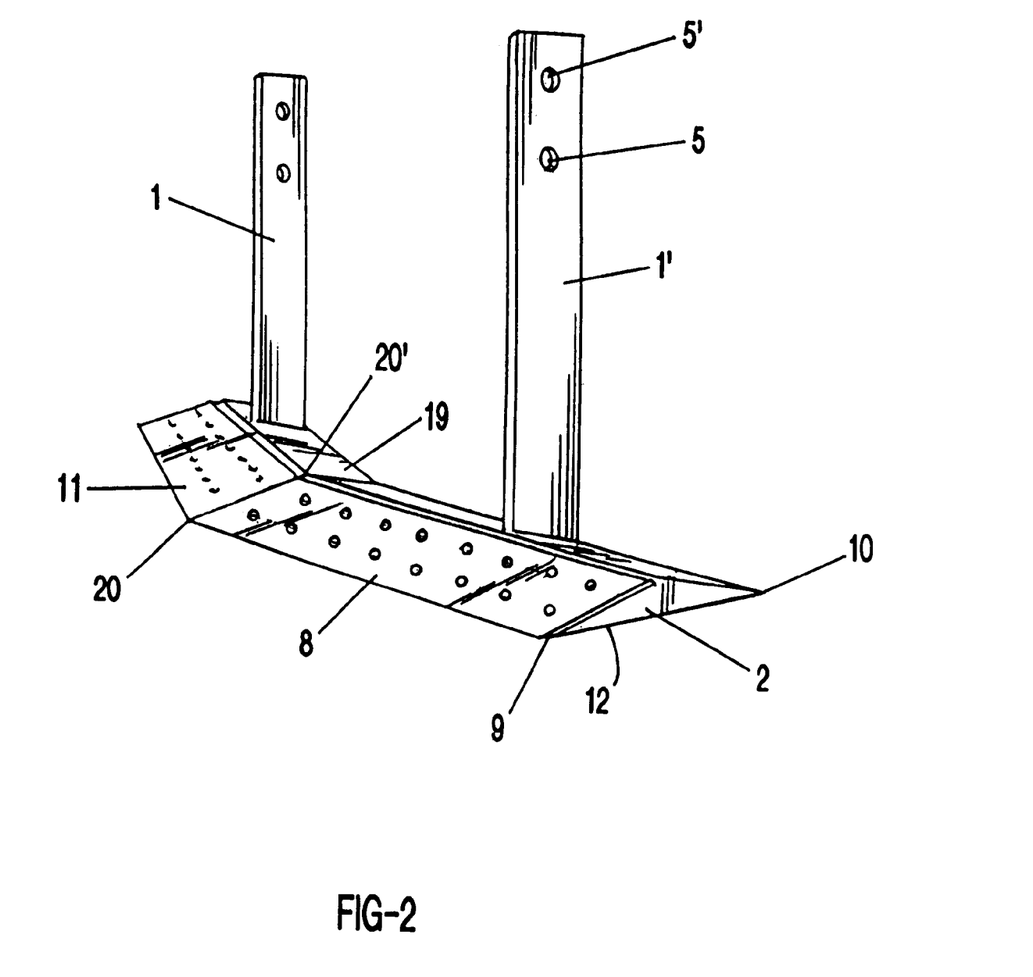
FIG. 2 is a perspective view of the apparatus according to the first embodiment of the invention showing, in particular, a blade attached to a horizontal member with two upright members.
Figure 3A:
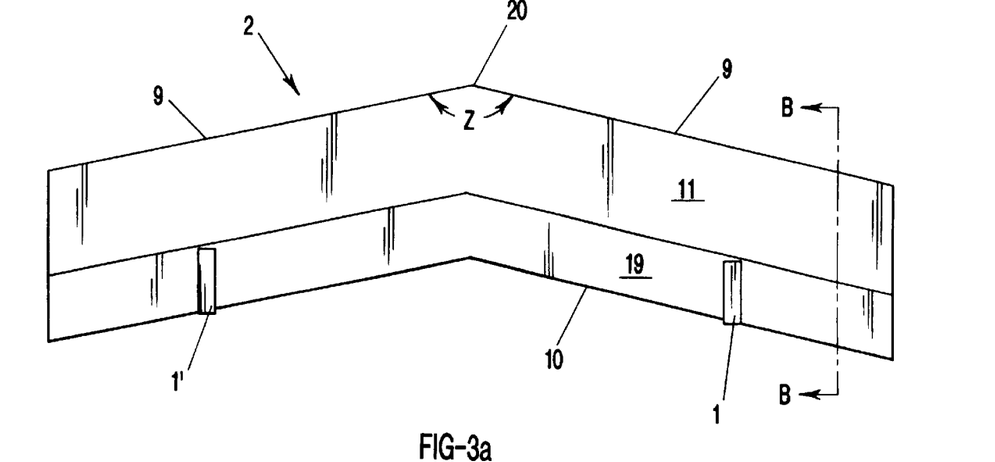
FIG. 3a is a top plan view of the embodiment shown in FIG. 3, with the ripping blade in place upon the horizontal member.
Figure 4:
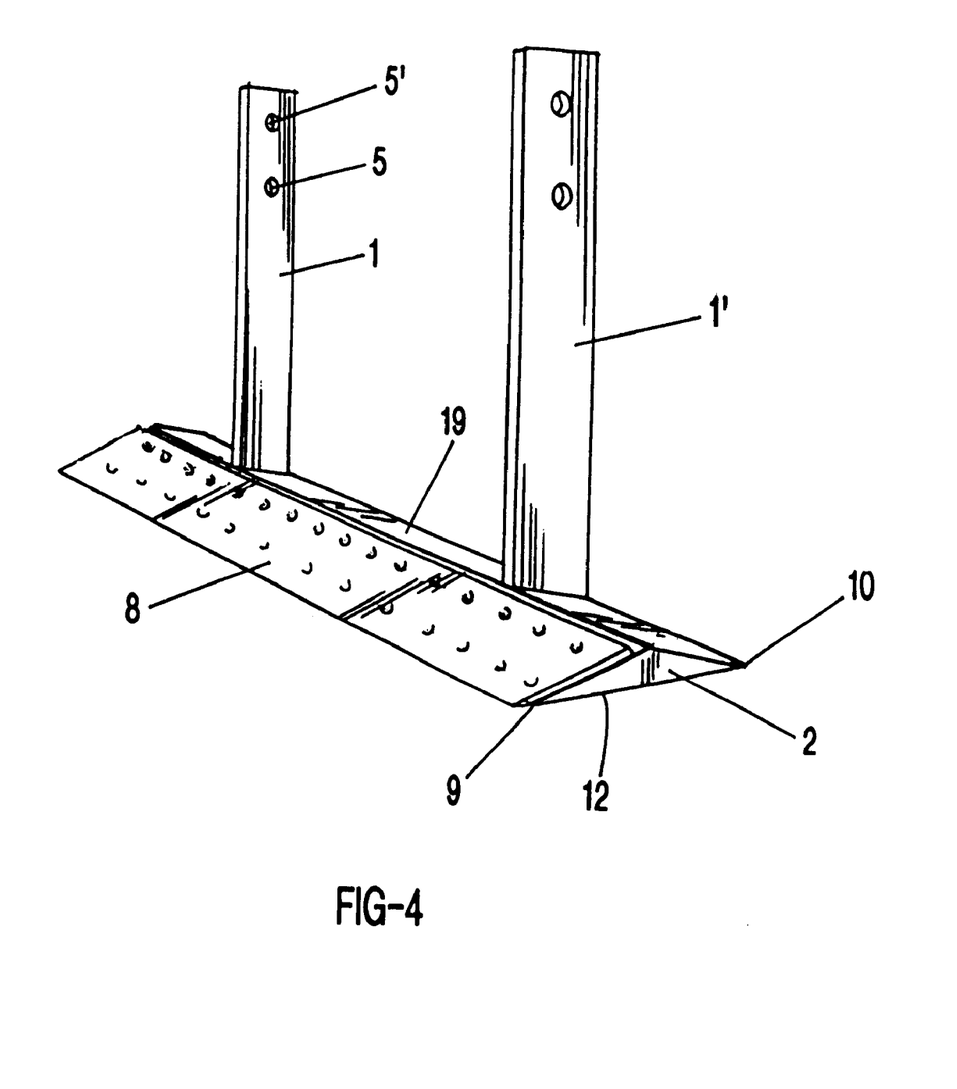
FIG. 4 is a perspective view of an apparatus according to the second embodiment of the invention.

In one embodiment of the invention shown in FIG. 4, the plan profile of the horizontal member 2 is substantially rectangular in plan profile, where the leading edge 9 defines a single line, and is substantially parallel to the trailing edge 10. Alternatively, and for many applications preferably, the horizontal member 2, manifests a V-shaped plan profile, as best seen in FIGS. 2 and 3a, wherein the leading edge 9 is angled to define a forwardly directed vertex 20 of the plan profile. In one embodiment, the vertex 20 includes an interior horizontal angle Z of approximately 154 degrees. An angled leading edge 9 as seen in FIG. 3a eases the movement of the member 2 through the subsurface. Angle Z of about 154 degrees provides for ready subsurface movement without placing undue stresses upon the member along its central axis of symmetry.

Figure 3:
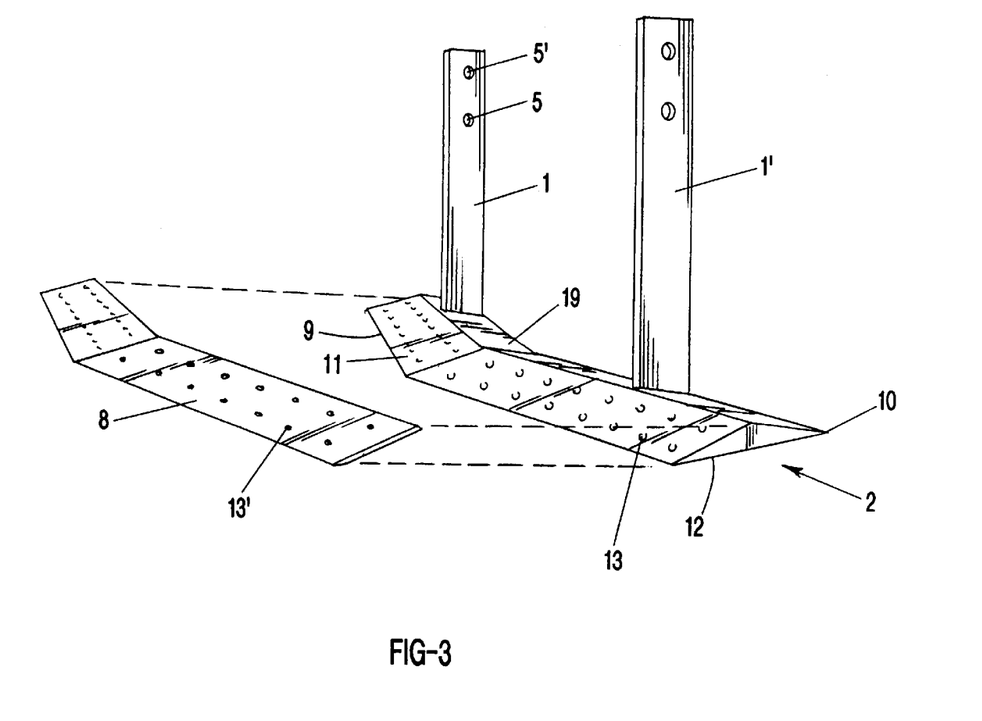
FIG. 3 is a perspective exploded view of the apparatus according to the first embodiment of the invention showing, in particular, detail of the ripping blade and position of attachment of the blade to the horizontal member.
Figure 3B:
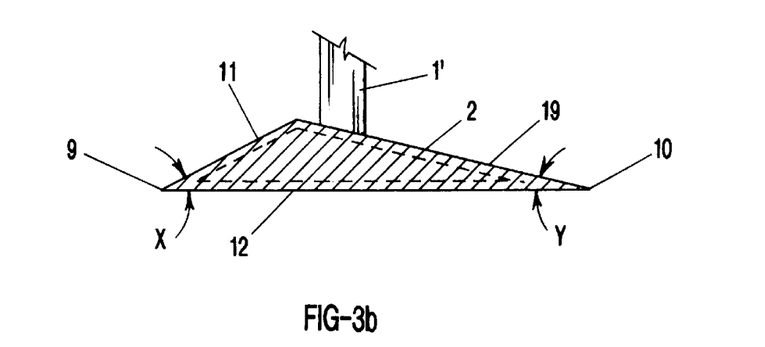

FIGS. 2–4 show that the apparatus preferably features an adjusting mechanism whereby the vertical position of the horizontal member 2 may be selectively adjusted. This selective adjustment may be provided, for example, by means of holes 5, 5' at various heights along the upright member 1 or 1', into which bolts or the like may be inserted and secured into the tractor yoke. Preferably, the upright members 1, 1' have a length that permits the horizontal member 2 to be moved through the subsurface at a depth of one to five feet as seen in FIG. 6; the overall length of each of the upright members 1, 1' accordingly may be from, for example, approximately five to ten feet.

Figure 5:
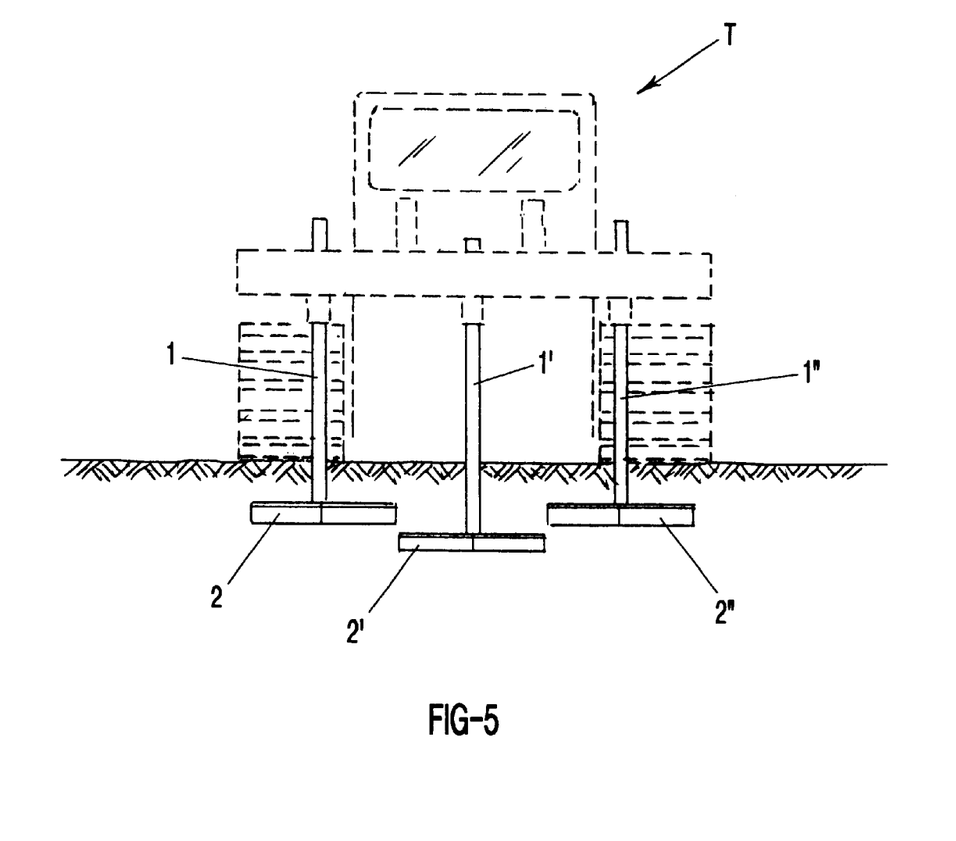
FIG. 5 is a rear elevation view of an apparatus according to the third embodiment of the invention.

Referring to FIG. 5, it is seen that in one embodiment, the invention features a plurality of horizontal members 2, 2', 2" each attached to a respective one of a plurality of upright members 1, 1', 1" such that the horizontal members are disposed at differing vertical positions. It is desirable, for example, for a central horizontal member 2' at one depth to be flanked by side horizontal members 2, 2', selectively positioned at a lesser depth, the array thereby generally presenting a V-shape in the vertical plane of reference. This multi-positioned array of a plurality of horizontal members promotes an efficient soil disruption pattern while not demanding a tractor of high torque or horsepower.

The design of the tractor yoke determines the horizontal position of the plurality of horizontal members 2, 2', 2". Some yoke designs align the forwardly directed vertices 20, 20' along a line in the horizontal plane. Other yoke designs align the forwardly directed vertices 20, 20' in a V-shape in the horizontal plane.

In practice, therefore, the apparatus of the invention is attached to the tractor T, as by bolting through the holes 5, 5' in the one or more upright members 1, 1' into a suitable yoke of conventional construction. Bolted attachment allows the apparatus of the invention to be removable attachable to the tractor T. The user attaches the upright members 1, 1' at a selected vertical position by predetermining which of the plurality of attachment holes 5, 5' will be employed to secure the apparatus to the tractor yoke. The user of the invention then uses the tractor T to insert the horizontal member 2 into the subsurface to the desired depth, e.g. one to four feet, while the tractor T is in motion. The forward motion of the tractor T pulls the horizontal member 2 horizontally through the subsurface. As the horizontal member 2 moves, the leading edge 9 (or, preferably, the front edge of the ripping blade 8) engages the subsoil and buried rocks and thrusts them upward, up and over the top surfaces of the horizontal member 2. Subsoil deeper than the bottom surface 12 remains undisturbed. The result is that the soil between the bottom 12 of the horizontal member 2 and the surface of the ground is raised and then dropped, breaking up any hard pan and compaction to promote aeration and infiltration from the surface. This is particularly useful on leach heaps at mining sites, to promote better leaching into the heap or pile while checking off-heap runoff. The tool is particularly useful for mining leach dumps, which can typically have large rocks (e.g., up to 10–20" in diameter, average size approximately 6" diameter, typically range dust size to 4" diameter).

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for beneficially disrupting dumps of mined material, said apparatus supported solely by a tractor and movable horizontally and vertically by the tractor and comprising:
    at least one upright member, having a top end and a bottom end, said top end removably connectable to the tractor; and
    a horizontal member attached to said bottom end of said at least one upright member, said horizontal member comprising:
        a leading top surface;
        a trailing top surface; and
        a bottom surface, said bottom surface being horizontal and intersecting said leading top surface at a leading edge and intersecting said tailing top surface at a trailing edge, wherein said intersection of said bottom surface with said top leading surface defines a first angle of at least approximately 11 degrees and said intersection of said bottom surface with said top trailing surface defines a second angle of between approximately 10 degrees and approximately 16 degrees;
        wherein said leading top, said trailing top and said bottom surfaces define a substantially tiangular cross section of said horizontal member, and wherein filter said horizontal member comprises a V-shaped plan profile, wherein said leading edge comprises two front edges intersecting at an angle to define a forwardly directed vertex of said plan profile, and said trailing edge comprises two edges parallel to respective ones of said two front edges.

2. An apparatus according to claim 1, further comprising at least one ripping blade attached to said leading top surface.

3. An apparatus according to claim 1 wherein said first angle is between approximately 35 degrees and approximately 37 degrees.

4. An apparatus according to claim 1 wherein said vertex comprises an interior horizontal angle of less than approximately 154 degrees.

5. An apparatus according to claim 1 wherein said upright member is vertically adjustable.

6. An apparatus according to claim 2 wherein said at least one ripping blade attached to said leading top surface extends forward beyond said leading edge and vertically below said horizontal bottom surface.

7. An apparatus for beneficially disrupting dumps of mined material, said apparatus supported solely by a vehicle and movable horizontally and vertically by the vehicle and comprising at least two raising blade units wherein each said unit comprises:

at least one upright member, having a top end and a bottom end, said top end removably connectable to the vehicle; and a horizontal member attached to said bottom end of said at least one upright member, said horizontal member comprising a V-shaped plan profile wherein a leading edge of said horizontal member comprises two front edges intersecting at an angle to define a forwardly directed vertex of said plan profile, and a trailing edge of said horizontal member comprises two edges parallel to respective ones of said two front edges, and said horizontal member filter comprising:

a leading top surface;

a trailing top surface; and a horizontal bottom surface, said horizontal bottom surface intersecting said leading top surface at the leading edge to define an angle of intersection of at least 11 degrees, and said bottom surface intersecting said trailing top surface at the trailing edge to define a second angle of intersection of between approximately 10 degrees and approximately 16 degrees, to define a substantially triangular cross section of said horizontal member.

8. An apparatus according to claim 7 wherein said raising blade units comprise horizontal members disposed at substantially the same vertical position.

9. An apparatus according to claim 7 wherein said raising blade units comprise at least one horizontal member disposed at a substantially different vertical position than other said horizontal members.

10. An apparatus according to claim 7 wherein said raising blade units comprise horizontal members disposed at substantially different vertical positions.

11. An apparatus according to claim 7 wherein said raising blade units comprise three horizontal members wherein a centrally positioned horizontal member is disposed at a vertical position substantially lower than said other horizontal members.

* * * * *